March 28, 1950 L. R. BEARD 2,502,121
STATOR FOR UNIVERSAL ELECTRIC MOTORS
Filed March 29, 1949
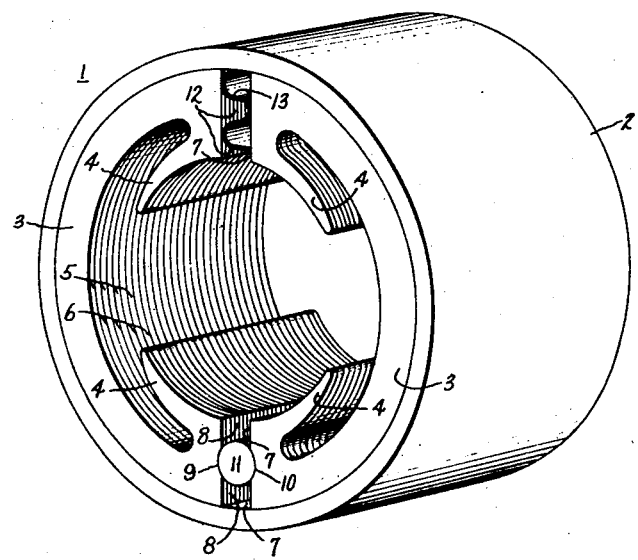
Inventor:
Lee R. Beard,
by *Bravell P. Mack*
His Attorney.

Patented Mar. 28, 1950

2,502,121

UNITED STATES PATENT OFFICE 2,502,121

STATOR FOR UNIVERSAL ELECTRIC MOTORS

Lee R. Beard, Fort Wayne, Ind., assignor to General Electric Company, a corporation of New York Application March 29, 1949, Serial No. 84,027

4 Claims. (Cl. 171—209)

My invention relates to dynamoelectric machines and more particularly to dynamoelectric machines of the commutator type having stator members provided with salient field poles. More specifically, the invention relates to universal electric motors, for operation on both alternating current and direct current, of the type having a salient pole stator member in which the magnetic structure is arranged to compensate for the armature reaction of the rotor member.

In commutator-type dynamoelectric machines it is necessary, for maximum efficiency, to effect substantial neutralization of the armature reaction at the point of commutation. This is especially important for universal motors which must operate on either alternating or direct current. Various means are employed to neutralize the armature reaction of such a motor, among which is the method of constructing the stator in a manner such that the field magnet structure of the stator automatically compensates for the armature reaction. One form of such a construction compensated stator provides a magnetic structure which is divided by a layer of non-magnetic material through the center of each field pole along a plane coinciding with the center line of the motor. This construction permits approximately the same air gap flux as if the magnetic structure were not divided but provides a high reluctance path for armature reaction flux through the magnetic structure of the stator, thus substantially neutralizing the armature reaction.

It is an object of this invention to provide an improved type of construction compensated stator member of the divided pole type.

It is a further object of the invention to provide a type of construction for stator members of this type which is simple and inexpensive.

A still further object of my invention is the provision of a form of construction for stator members of the divided pole type which is readily adaptable to mass production techniques and procedures.

In carrying out my invention in one form, I provide a stator member for a dynamoelectric machine which has an outer retaining ring of non-magnetic material. Positioned inside the retaining ring is the magnetic structure which comprises a divided circular yoke portion of laminated magnetic steel. On opposite sides of the center line of the yoke, two projections extend radially inward from the yoke portion to form two field poles. Each such polar projection and the portion of the yoke from which it projects is split along a plane which coincides with the center line of the stator member. Located between the two split portions of one polar projection, magnetically separating the two semi-circular yoke segments at that point, is a non-magnetic rod-like spacer positioned parallel to the center line in a longitudinal recess in the split surface of each adjacent polar portion. A non-magnetic spring-like member is positioned between the two semi-circular yoke segments on the opposite side of the center line, completing the magnetic separation of the two yoke segments and simultaneously securing the two yoke segments within the outer retaining ring.

For a more complete understanding of my invention, reference should be had to the accompanying drawing, the single figure of which is a perspective view of a stator member embodying my invention.

Referring to the drawing, a stator member in which my invention is incorporated is designated generally by the numeral 1. The stator 1 has an outer cylindrical protective and retaining member 2 which is made of a non-magnetic material with good tensile strength qualities, such as aluminum or stainless steel. Immediately inside the inner surface of member 2 is a substantially circular magnetic yoke portion composed of two separated yoke segments 3. The substantially semi-circular yoke segments 3 have two radially inward projections 4, each of which forms half of a salient field pole. Taken together, two adjacent, closely spaced, but slightly separated projections 4 form a field pole adaptable for the location thereon of a suitable exciting winding (not shown).

Yoke segments 3 and their inward projections 4 are laminated, being made of a plurality of relatively thin arcuate flat sheets 5 of magnetic material, preferably steel. The flat sheets 5 are positioned perpendicularly to the center line of stator member 1, with adjacent sheets being preferably separated by a thin layer 6 of electrically insulating material in order to substantially prevent eddy currents due to alternating magnetic flux in the magnet structure composed of the yoke and field poles.

Yoke members 3 and polar projections 4 thereon are separated by diametrically opposed spaces or gaps 7 on each side of the center line of stator 1. The air spaces 7 are coplanar, with the plane in which they lie coinciding with the center line of stator 1 and the center lines of the field poles 4, 4, thus dividing the magnetic structure of stator 1 into substantially equal yoke segments 3, with each such yoke segment having two polar projections 4.

One inner surface 8 of a yoke segment 3, which faces a similar surface on the other yoke segment 3 has a longitudinal recess 9 extending completely across surface 8 parallel to the center line of stator 1 adapted to contain a portion of a rod-like spacer member. The opposing similar surface on the other yoke segment 3 has a similar recess 10 extending across it parallel to the center line of stator 1. A rod-like spacer member 11 made of non-magnetic material such as aluminum, stainless steel or bronze, is positioned between the two opposing surfaces of yoke segments 3 in recesses 9 and 10. Member 11, which extends the full length of recesses 9 and 10, serves as a spacer to separate magnetically the two yoke segments 3 and their polar projections 4 at this point.

Diametrically opposite spacer 11, between a surface 12 on one yoke segment 3 and a similar opposing surface on the other yoke segment 3 is located a wave spring 13. Spring 13 is of non-magnetic material with tensile qualities which provide the desired spring action such as, for example, brass or stainless steel. Spring 13 provides a magnetic separation between the two yoke segments 3 at this point. At the same time, the dimensions of spring 13 are such that it serves also to secure the yoke segments 3 against the outer retaining member 2. In addition, spring 13 extends entirely through the magnetic yoke along surface 12 on one yoke segment 3 and the similar opposing surface on the other yoke segment 3 so that spring 13 secures in position the laminations 5 of which the magnetic yoke is comprised.

While the stator member 1 of the drawing has two polar projections 4, 4, it will be readily apparent that this construction is equally applicable to multi-polar stators having four or more poles. Furthermore, while a laminated magnetic structure is shown, it will be readily understood that yoke segments of solid magnetic material may be used. A stator constructed in accordance with my invention is especially applicable to universal motors but may be used also for other commutator type dynamoelectric machines including series, shunt, and compound wound.

While I have illustrated and described one preferred embodiment of my invention, many modifications will occur to those skilled in the art and, therefore, it should be understood that I intend to cover by the appended claims any such modifications which fall within the true spirit and scope of my invention.

What I claim as new and desire to secure by Letters Patent of the United States is:

1. A stationary member for a dynamoelectric machine comprising an annular non-magnetic outer retaining ring, a substantially circular magnetic yoke portion positioned immediately adjacent the inner surface of said retaining ring, a first polar projection extending radially inward from said yoke, a second polar projection diametrically opposite said first projection extending radially inward from said yoke, said yoke and said first-named and said second-named projections being divided by a non-magnetic medium along a diameter of said yoke extending substantially through the centers of said first-named and said second-named projections forming two substantially semi-circular yoke segments whereby a path of high reluctance is provided for armature reaction flux, a non-magnetic spacer positioned between two opposing separated radial surfaces of said yoke segments on one side of the center line of said stator member, and a non-magnetic spring positioned between the opposing separated radial surfaces of said yoke segments on the other side of said center line to tightly secure said yoke segments within said retaining ring.

2. An armature reaction compensated stator member for a commutator type motor, said stator member comprising a substantially circular magnetic yoke portion, a first projection extending radially inward from said yoke to form one field pole, a diametrically opposed second projection extending radially inward from said yoke to form a second field pole, said yoke and said first-named projection and said second-named projection being divided by an air gap extending along a plane coinciding with said center line and passing through the centers of said first-named projection and said second-named projection forming two semi-circular yoke segments whereby a path of high reluctance is provided for armature reaction flux, each of said segments having a groove parallel to the center line of said yoke in one of the surfaces thereof adjacent to said air space, said grooves being adapted to contain a portion of a spacer member, a non-magnetic spacer member positioned between said yoke segments in said grooves, a wave spring member of non-magnetic material positioned between the surfaces of said yoke segments adjacent to the air space on the opposite side of said center line from said spacer member, and an outer circular retaining member of non-magnetic material around the outer periphery of said yoke segments, said spring member forcing said segments into tight engagement with said retaining member.

3. In a commutator electric motor of the universal type for operation on either alternating current or direct current, an armature reaction compensated stator comprising an outer cylindrical casing of non-magnetic material, two combination yoke and pole members positioned abutting the inner surface of said casing forming a substantially circular magnet structure, inwardly extending portions of each such combination yoke and pole member forming half of two magnetic field poles, a non-magnetic spacer member positioned parallel to the center line of said stator separating said two yoke and pole members on one side of said center line, and a resilient non-magnetic spacer member separating said two yoke and pole members on the opposite side of said center line, the two said yoke and pole members forming two opposite field pole projections divided magnetically by said spacer and said resilient spacer member along a common plane through said center line, said resilient spacer member biasing said yoke and pole members into tight engagement with said outer casing member.

4. In a commutator type dynamoelectric machine, an armature reaction compensated stator comprising an outer cylindrical casing of non-magnetic material, at least two combination yoke and pole piece member positioned against the inner surface of said casing forming a substantially circular magnetic structure, two inwardly extending projections on each such combination yoke and pole piece forming half of two magnetic field poles, at least one non-magnetic spacer separating two combination yoke and pole piece member, and at least one resilient non-magnetic spacer separating two combination yoke and pole piece member, the said yoke and pole piece member forming pairs of field poles divided magnetically by said spacers and said resilient spacers, said resilient spacers biasing said yoke and pole piece member into tight engagement with said outer casing.

LEE R. BEARD.

No references cited.